United States Patent
Shagam et al.

(10) Patent No.: US 7,401,322 B1
(45) Date of Patent: Jul. 15, 2008

(54) SOFTWARE DEBUGGING TOOL

(75) Inventors: Eli Shagam, Brookline, MA (US); Josef Ezra, Ashland, MA (US); Avihu Goral, D.N. Misgav (IL)

(73) Assignee: EMC Corporation, Hopkinton, MA (US)

(*) Notice: Subject to any disclaimer, the term of this patent is extended or adjusted under 35 U.S.C. 154(b) by 574 days.

(21) Appl. No.: 09/962,485

(22) Filed: Sep. 25, 2001

(51) Int. Cl.
*G06F 9/44* (2006.01)
*G06F 11/00* (2006.01)

(52) U.S. Cl. .................. 717/128; 717/130; 717/131; 714/35; 714/45

(58) Field of Classification Search ............. 717/128, 717/129; 714/35, 45
See application file for complete search history.

(56) References Cited

U.S. PATENT DOCUMENTS

| | | | | |
|---|---|---|---|---|
| 5,050,168 A | * | 9/1991 | Paterson | 714/35 |
| 5,067,073 A | * | 11/1991 | Andrews | 714/38 |
| 5,121,489 A | * | 6/1992 | Andrews | 714/38 |
| 5,758,061 A | * | 5/1998 | Plum | 714/35 |
| 5,790,858 A | * | 8/1998 | Vogel | 717/130 |
| 5,966,541 A | * | 10/1999 | Agarwal | 717/132 |
| 6,275,981 B1 | * | 8/2001 | Buzbee et al. | 717/158 |
| 6,311,327 B1 | * | 10/2001 | O'Brien et al. | 717/114 |
| 6,327,700 B1 | * | 12/2001 | Chen et al. | 717/127 |

* cited by examiner

*Primary Examiner*—Tuan Q. Dam
*Assistant Examiner*—Michael J Yigdall
(74) *Attorney, Agent, or Firm*—Krishnendu Gupta; Penelope S. Wilson; Jason A. Reyes

(57) ABSTRACT

In a method for testing computer code, each branch that occurs within the machine-readable code is located. A first tracepoint is placed immediately after the beginning of the branch and a second tracepoint at the target address of each branch, each tracepoint generating an indicator. When the machine-readable code with the tracepoints is executed on the target computer, the method identifies those indicators that have been generated by their corresponding tracepoints, thereby permitting determination of those branches that the program control flow has not passed through. The test cases are modified to exercise the previously omitted branches, and the converted code is re-executed, until all branches have been properly exercised. The tracepoints are automatically eliminated after they have performed their intended function.

17 Claims, 7 Drawing Sheets

```
Serv  a7_main_util.c 348           (GMPTR) rdf_dynamic_info_table, dir_num*s
349              sizeof(T_RDF_DYNAMIC_INFO), DMA_RETRY_YE
350
351        if (dynamic_rdf_info.valid != 0xff)
0x48a674     lbz    r0,47(r1)
0x48a678     cmpwi  r0,255
0x48a67c     beq    0x48a69c <show_ra_serial_numbers+252)
352:         CLEAR_BUFFER(&dynamic_rdf_info, sizeof(T_RDF_DYN
0x48a680     li     r9,6
0x48a684     mr     r3,r31
0x48a688     mtctr  r9
0x48a68c     li     r0,0
0x48a690     stw    r0,0(r3)
0x48a694     addi   r3,r3,4
0x48a698     bdnz   0x48a690 <show_ra_serial_numbers+240)
353:        /* compute interface flags */
354:        dir_rec = (T_IMPL_FILE_DIRECTOR_RDF_REC *) get_di
355:
0x48a69c     lis    r3,115
0x48a6a0     mr     r4,r30
0x48a6a4     addi   r3,r3,12288
0x48a6a8     bl     0x3de758 <get_dir_impl_record_pointer>
356:        ra_if_config_flags = dir_rec->if_a_config_flags;
0x48a6ac     lbz    r29,0(r3)
```

FIG. 3

```
 0    | i lin gdb_c_test

0x9         0x547ab4           0x5
0xa         0x547ad8           0x5
0xb         0x547ac4           0x0
(sgdb)tstatus
Num         Addr               Hits ⟵ 54
0x1         0x547858           0x6
0x2         0x547838           0x3c
0x3         0x547880           0x6
0x4         0x547888           0x6
0x5         0x547898           0x6
0x6         0x5478a4           0x5
0x7         0x547a04           0x6
0x8         0x547a18           0x6
0x9         0x547ab4           0x6
0xa         0x547ad8           0x6
0xb         0x547ac4           0x0 ⟵ 56
```

FROM FIG. 5A

```
if (remove_target_extent_from_fs_sessions(p_dv, p_dv_>cyl * 0x00
                                          p_dv->cyl * 0x0000 + p
    {
    /* sives: doesn't matter if head and cyl changed for error cas
    return ; /*if fail to remove the indirect, exit */
    }

/* --- start fix 11313 ---*/
/* restore original haed and cyl due to
   remove_target_extent_from_fs_sessions incrementing them */
p_dv->head = saved_head;
p_dv->cyl = saved_cyl;
p_dv->track_id_table_pointer = saved_track_id_table_ptr;
p_dv->cyl_id_table_pointer = saved_cyl_id_table_ptr;
/* --- end fix 11313 --- */

}
/* check wpend limit */
```

FIG. 5B

SOFTWARE DEBUGGING TOOL

BACKGROUND OF THE INVENTION

The present invention relates to a tool for testing and debugging computer programs, and more particularly to one that facilitates the testing of all relevant program code.

Computers and the software that causes them to perform useful work have become pervasive in virtually all aspects of daily life. Not only do they facilitate the performance of such mundane tasks as word processing, maintaining customer billing records and preparing personal income taxes, but they also are intimately involved in monitoring and regulating processes that can have an immediate impact on the well-being of personal property and even human lives, such as the operation of nuclear power plants, the safe coordination and control of airplane traffic and the delivery of vital medical services.

Therefore, one of the most critical phases in the development of computer software is the testing and debugging phase, in which faults or "bugs" in the software code are detected and corrected, so as to minimize the likelihood of the software failing to operate as intended. Bugs can be caused by the software developer's use of improper logic to implement the desired function, his/her failure to comply with the proper syntax dictated by the programming language in question, or even by something as trivial as a typographical error.

There are various tools that can facilitate the testing and debugging operation. Syntax errors are detected in the compilation phase. Certain known debugging tools permit the software developer to insert breakpoints at each location where the developer desires to examine the state of the program. When the execution of the program reaches this breakpoint, further execution is interrupted. The developer can then systematically examine the contents of the appropriate memory locations or registers where the program variables are stored, to determine if the program has returned the proper value upon execution of a particular instruction. Then, the developer can either step through the remainder of the program one instruction at a time or cause the program to resume execution until it arrives at another breakpoint, in either case observing the program state at various locations. Upon observing an improper value, the developer can analyze its significance and formulate the appropriate corrective action.

Alternatively, there are tools that permit the developer to insert tracepoints in lieu of breakpoints into the desired locations. Instead of causing the program to interrupt its operation, tracepoints initiate any one of several activities as defined by the software developer, such as generating an indicator confirming that the tracepoint has been reached, printing out data reflecting the state of the program at the time the tracepoint was reached, or collecting and recording such data for retrieval and analysis at a more convenient time. Such tools are particularly useful with programs in which an interruption of the program would negatively affect the program's behavior, e.g., programs that would interpret the interruption to be an indication of computer failure and take action to activate redundant or back-up systems.

The GNU Debugger (commonly referred to as GDB), a tool distributed by the Free Software Foundation, Inc. of Cambridge, Mass., is a commonly used debugging tool, especially for programs written in the C or C++ programming languages, and one that is amenable to use with either breakpoints or tracepoints. For example, Cygnus Solutions, Inc. of Sunnyvale, Calif. offers an extension to GDB named Introspect jointly developed by Cygnus Solutions and EMC Corporation of Hopkinton, Mass., assignee of the present invention), consisting of code inserted into GDB and a software "agent" running on the target program, that facilitates the definition and insertion of tracepoints into the target program.

However, the GDB, even in the extended version offered discussed above, does not by itself provide any guidance as to where to place such tracepoints in order to achieve optimal code coverage. In order to maximize the likelihood of finding latent bugs, thereby improving the overall quality of the computer program, it is important that adequate code coverage be achieved by the set of test cases being used to check the program. A particular set of test cases may not accomplish the desired results if critical areas of the code are not even exercised by the test cases. Over the years, various testing methodologies have been devised to measure the extent of code coverage produced by a particular set of test cases, determining the extent of such parameters as line coverage, statement coverage, branch coverage, path coverage; logical condition coverage, and loop coverage, to name a few. By knowing the extent of code coverage, the software developer can make an informed decision about where to add to or modify the test cases, so as to achieve the desired level of program quality or reliability. Generally, the developer often is required, for a variety of economic, technical or other reasons, to achieve a balance between the degree of code coverage (and consequently the acceptable degree of program quality) and the amount of time and resources available for performing the testing.

Even in those situations where the software developer wants to achieve maximum code coverage, the complexity of a large program may make it difficult to design test cases that will reliably ensure such coverage. Furthermore, simply knowing that maximum coverage has not been achieved may not adequately inform the developer how to revise the test cases to improve coverage. Rather, it is important for the developer to know exactly where all the gaps in coverage occur.

Modifications to an existing program continually evolve, due partly to the developer's desire to keep the program competitive by adding new or improved functionality, but due mostly to the detection of errors that, despite extensive testing during the development phase, only materialize after the software has been in daily use by hundreds of users in a real-life environment for an extended period of time.

Once a software developer has created a suite of software "fixes", i.e., new software routines implementing new functionality and/or amended routines to correct previously detected errors, the question arises as how best to test these fixes so as to be satisfied that the new/corrected code has been adequately exercised, and that all intended results are achieved. Since it is quite likely that any new code would affect the preexisting code when integrated into the preexisting code, it has generally been customary to test the combination of the two, to uncover all potential problems. Nevertheless, it clearly would be preferable to eliminate as many bugs as possible from the fixes before they are integrated into the preexisting program, because eliminating those bugs after integration could be much more complex and could require much more time and many more resources. Intuitively, testing every single line of the code would appear most likely to yield optimum results. However, in most cases performing such extensive testing would be impractical, since it would occupy too many valuable resources, both in terms of personnel and testing resources, for too long a period of time.

Therefore, it is an objective of the present invention to improve the testing of computer program fixes by verifying adequate code coverage with minimal commitment of testing resources.

It is another objective of the present invention to achieve a testing procedure that automatically removes from the program code any testing code (e.g., tracepoints) that had been inserted into the program code to facilitate testing, after the execution of such testing code, so as to restore the program to its pre-testing condition and to eliminate undesirable interference with the behavior of the system on which the program code is designed to operate.

It is yet another objective of the present invention to achieve the above results in conjunction with an industry standard program debugger.

The above-stated objectives, as well as other objectives, features and advantages of the present invention will become readily apparent from the following detailed description, to be read in conjunction with the appended drawings.

BRIEF SUMMARY OF THE INVENTION

The present invention is directed to the efficient testing of computer code. In one aspect of the invention, a method of testing code includes the following steps. The code is accessed in a format that is operable on a designated computer (e.g. assembly code), generally referred to as machine-readable code, after having been transformed from the form initially produced by the software developer (generally source code). Then, each branch that occurs within the machine-readable code is automatically located. At an appropriate position within each branch, there is automatically inserted at least one tracepoint configured to generate an indicator in response to the program control flow passing through such position. After the machine-readable code containing the tracepoints has been executed on the designated computer in a manner dictated by test cases written by the software developer, the inventive method identifies which of the intended indicators have been generated by their corresponding tracepoints, thereby determining which of the tracepoints the program control flow has passed through.

The software developer's goal in writing test cases is to cause program control flow to pass through each execution block of instructions contained in the program being tested, where an execution block of instructions is a group of consecutive instructions structured in such a way that if program control flow passes through one of such instructions, it will flow through all such instructions. By placing a tracepoint not only immediately after each branch that occurs within the machine-readable code being tested but also at the target address of each such branch, the present invention is able to determine whether or not the program control flow does indeed pass through the entire execution block of instructions, and to specifically identify those portions of the execution block that the program control flow has missed.

If it is determined that certain tracepoints have not generated the intended indicators, this would mean that the program control flow has not passed through the position in the machine-readable code occupied by the associated tracepoint. Then, the testing methodology that should have directed the program control flow through the branch (or branches) associated with that tracepoint (or tracepoints) can be modified by the program developer to redirect the flow accordingly. The machine-readable code can then be retested, to verify that the previously omitted branch(es) have now been adequately exercised, by verifying the presence of the previously missing indicator(s).

In a particularly advantageous aspect of the invention, the tracepoint can be configured in such a way as to cause itself to be deleted, i.e., removed from the actual code that is executable on the designated computer, immediately after passage of the program control flow through that tracepoint. In this way, once all of the code branches have been properly exercised, as indicated by the generation of all the intended indicators, the code will be in suitable condition for execution on the designated computer in the form originally intended by the software developer. Furthermore, this expedites the completion of the testing process.

In another aspect of the invention, there is a method that is particularly suitable for testing code that represents changes (i.e., either additions, deletions or modifications) to the code of a preexisting computer program. Typically, at the time that a software developer makes changes or "fixes" to a preexisting computer program, he/she uses one of several conventionally known software tools to (a) identify those portions of the code that are different, and (b) store such differences in a fix file or patch file. These tools store the differences in such a way that, when they are accessed for the purpose of developing software routines for testing the difference code, they are delivered and presented to the testing engineer in a format that correlates the machine-readable code with its corresponding source code. The present invention analyzes the fix or patch files and places the tracepoints in the machine-readable code in the manner previously described. The testing then proceeds as previously described, but only with respect to the difference code. If, upon completion of the testing, it is shown that the program control flow failed to pass through certain tracepoints, then the machine-readable code is analyzed in conjunction with its correlated source code, to assist the testing engineer in formulating a revised testing procedure to pick up the missed tracepoints.

In yet another aspect of the invention, a computer-readable medium contains stored instructions for testing a computer program. When executed by a processor in a manner dictated by test cases written by the software developer, these instructions cause the processor to access the machine-readable code, and locate each branch that occurs within the assembly code. The instructions further cause the processor to insert, immediately after the beginning of each branch, a tracepoint configured to generate an indicator in response to the program control flow passing through the branch. The processor also will execute the assembly code containing the tracepoints on a designated computer and then identify which of the intended indicators have been generated by their corresponding tracepoints. If one or more indicators have failed to be generated, due to the program control flow having failed to pass though the positions associated with the corresponding tracepoints, then the software developer can modify the test cases to redirect the program control flow so that it passes through such previously missed positions and the testing process can be repeated.

BRIEF DESCRIPTION OF THE DRAWINGS

FIG. 3 is a typical display generated by the present invention to indicate code branches in which tracepoints have been inserted;

FIG. 4 is a typical display generated by the present invention to indicate the execution status of previously inserted tracepoints;

FIG. 5A and FIG. 5B are the upper and lower portions, respectively of a representative screen display depicting a typical code fix, detailing the old lines of code versus the respective new lines of code.

DETAILED DESCRIPTION OF THE PREFERRED EMBODIMENT

Figure 1:
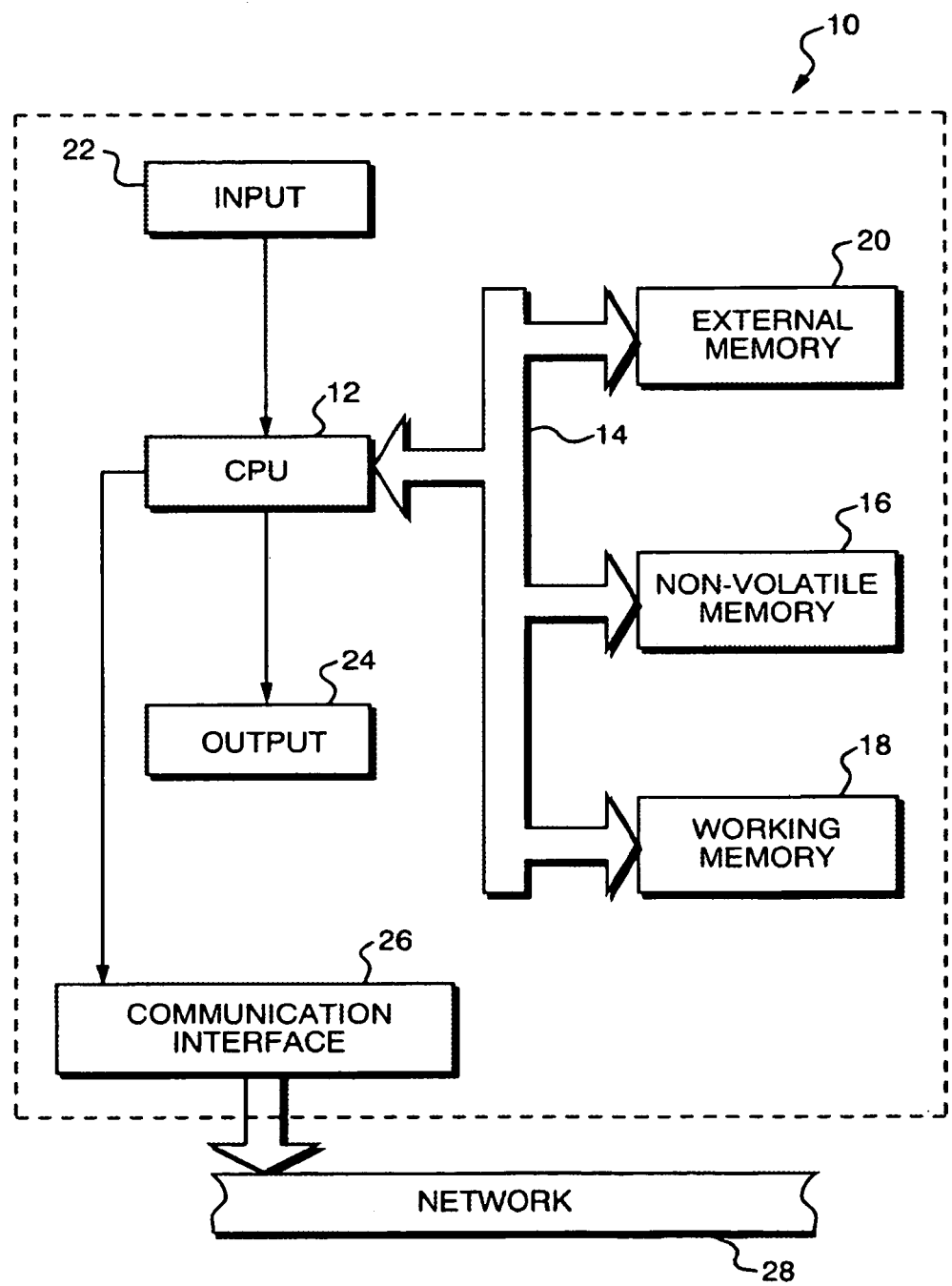
FIG. 1 is a block diagram illustrating a computer system in which the invention can be implemented.

With reference to FIG. 1, the present invention is operable in the environment of a conventional computer system 10 having a central processor (CPU) 12 that is interconnected via a bus 14 with other components of the computer system 10, including a non-volatile memory (e.g., hard disk) 16 and a working memory (e.g., random access memory or RAM) 18 for storing information and instructions needed by said processor 12, an external memory 20 (e.g., fixed or removable disk) configured for storing either programs or data, an input device 22 (e.g., keyboard, mouse, etc.), an output device 24 (e.g., a video display terminal, monitor, printer, etc.), and a communications interface 26 for allowing communications via an external network 28 (e.g., a local area network or LAN) with other computer systems. The software programming code that implements the present invention can be stored at any given time in any one of the non-volatile memory 16, the working memory 18 or the external memory 20.

The present invention was developed for the testing of software for the Symmetrix™ intelligent data storage system, a product of EMC Corporation of Hopkinton, Mass. that works in conjunction with companion EMC computer systems, so as to facilitate continuous data availability in the event of any major component failure or power outage affecting those computer systems, and to permit the repair or replacement of a failed component without any interruption in operation of the systems.

The present invention is capable of working in tandem with any one of several well-known debugging tools. The particular embodiment dealt with in this description was designed to operate in conjunction with the GNU Debugger (or GDB) produced by the Free Software Foundation of Cambridge, Mass. In one of its conventional modes of operation, the GDB permits the addition of certain debugging information to the executable code of the program being tested, the nature and scope of the debugging information being determined by the software developer or quality control engineer charged with insuring an acceptable level of quality within the program. For example, a tracepoint could initiate the collection of data reflecting the state of a particular variable upon execution of a particular line or block of code, or it could suspend further execution until the individual testing the code has had an opportunity to examine conditions as they exist at that point in the program and to satisfy himself that everything is working as intended.

The present invention takes advantage of the tracepoint-inserting attribute of the GDB (or of similar well-known debugging tools) and modifies it so as: (a) to permit the automatic insertion, into critical locations within the program code, of a specific type of tracepoint that generates an indication once the program flow of control has reached the location in the program code occupied by the tracepoint and (b) to make use of the information conveyed by these tracepoints to determine the effectiveness of the testing regime imposed by the testing engineer.

Figure 2:
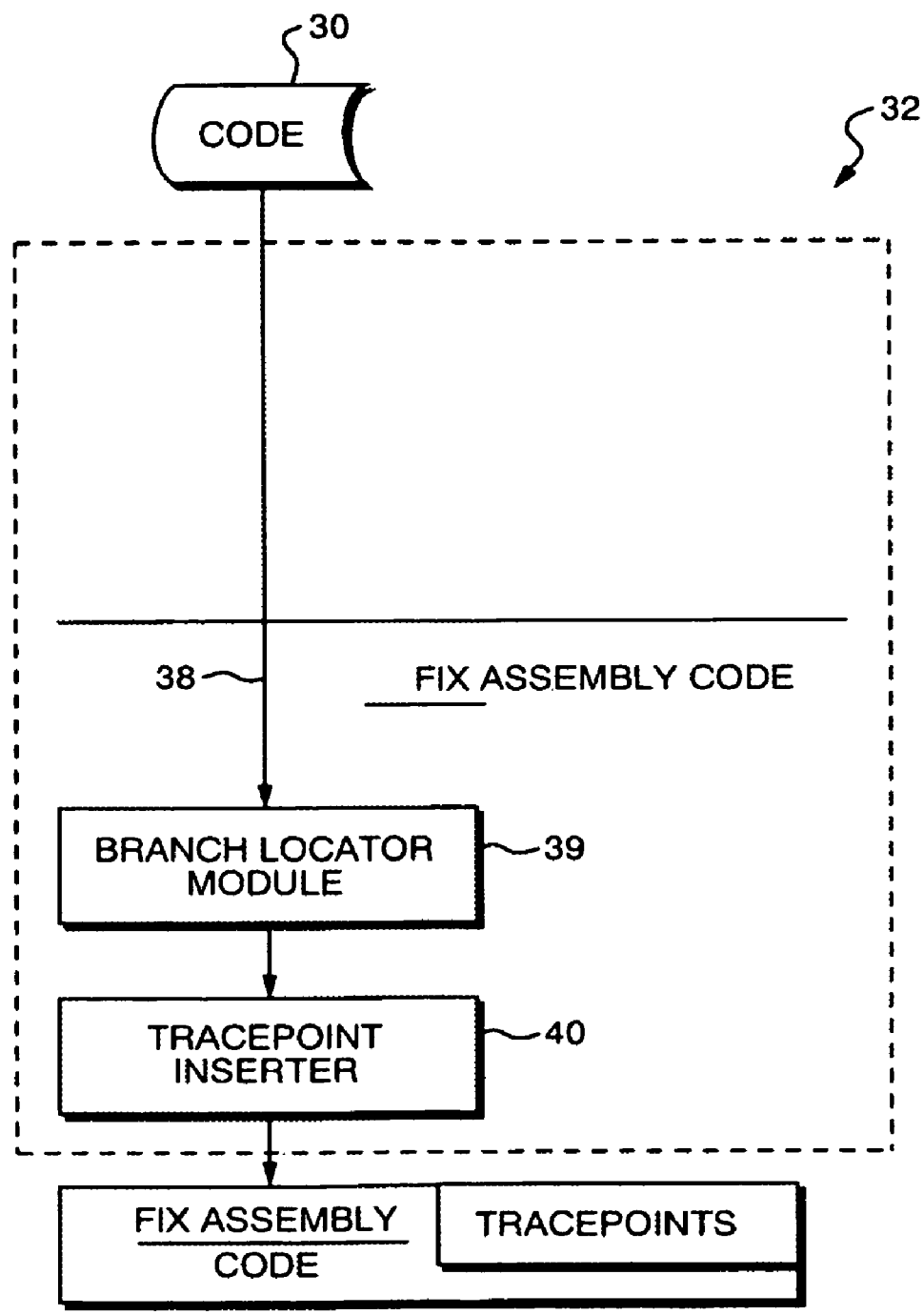
FIG. 2 is a block diagram illustrating the functional components of a software debugging tool configured in accordance with the present invention.

Referring now to FIG. 2, the code being tested is stored in a memory location 30 (comparable to the external memory 20 of FIG. 1). In this particular embodiment of the invention, the code stored in memory location 30 represents changes previously made to a preexisting computer program (also known as "patches" or "fixes"), i.e., either corrections for previously discovered bugs, or additional functionality to improve the marketability of the preexisting program. Typically, a software developer would make such changes to the source code of the preexisting computer program and then convert the source code, in a well-known fashion, into machine-readable code suitable for operation on the computer for which it is ultimately intended (e.g., assembly code, for the purposes of this embodiment). Then, the software developer would use a conventionally known version control software tool, such as the Concurrent Versions System (CVS) tool also distributed by the Free Software Foundation, to place into memory location 30 only the difference code representing the fixes, configured such that when a particular fix is retrieved from the memory location, it can be presented in a format in which the source code is correlated with its corresponding assembly code.

In so doing, the developer would activate an elf file, which would provide access to all the source code that is relevant to a specific machine configuration. Along with the source code that is relevant to a specific machine configuration. Along with the source code the developer would have access to its correlated assembly code (as further discussed in connection with FIG. 3 below) and would also get a list of all the latest fixes that were used to update the source code. In order to check a certain fix (as further discussed in connection with FIGS. 5A and 5B (below), the present invention analyzes the assembly code, which applies to the updated source code that is included in that fix.

Figure 5A:
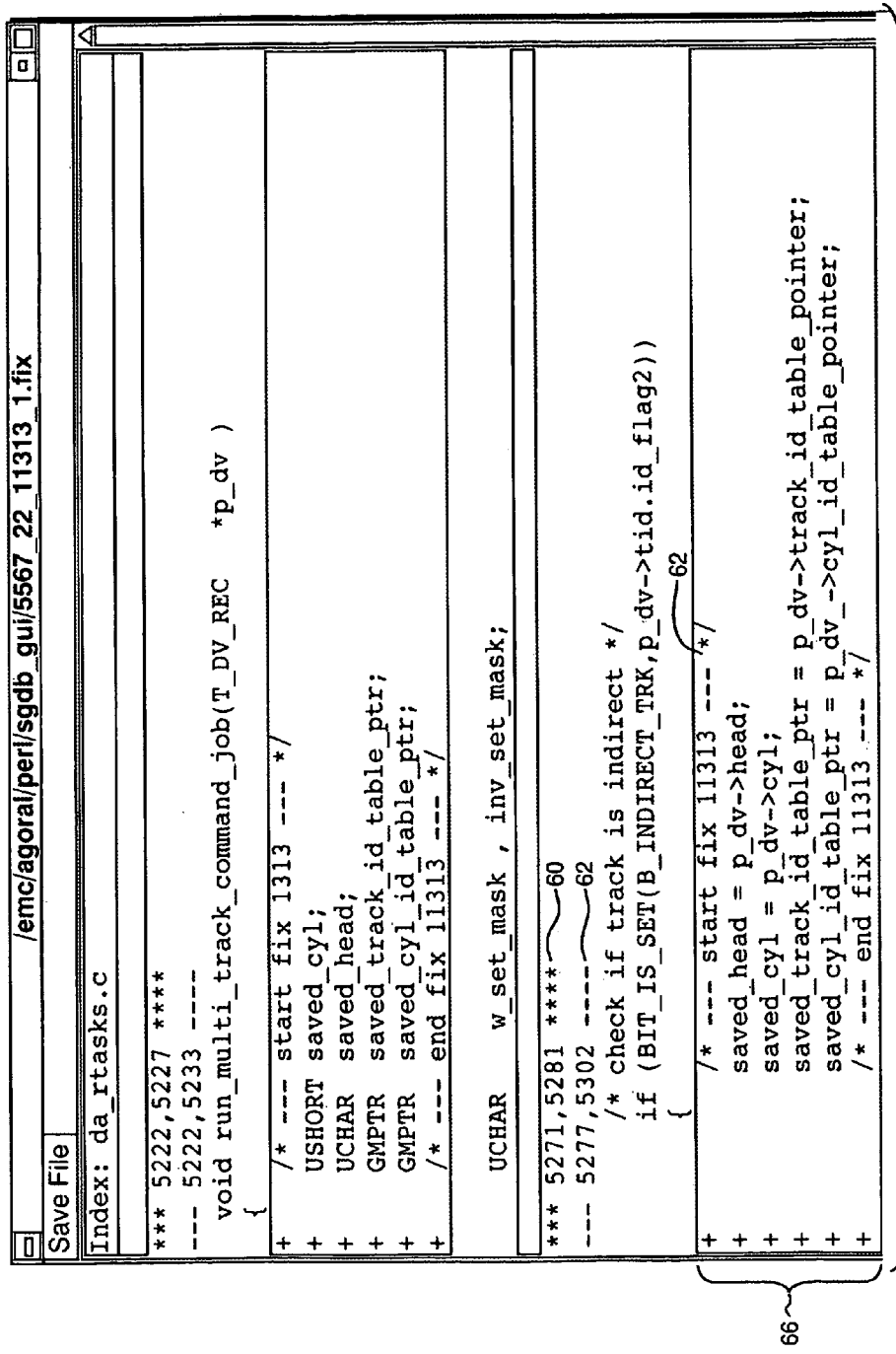

FIG. 5A and FIG. 5B show the upper and lower portions, respectively of a representative screen display depicting a typical fix that had been configured in this fashion. At 60 in FIG. 5AU, the two numbers enclosed by "***" signs stand for the original line range of the changed code. At 62 in FIG. 5A, the two numbers enclosed by "---" signs stand for the final line range of the changed area. The "+" signs at 66 in FIG. 5A, to the left of the code lines indicate that these particular lines are additions to the preexisting computer program.

Referring again to FIG. 2, a debugging tool 32, previously configured by a testing engineer using conventional techniques to impose on the program code a particular set of test cases deemed to be suitable for exercising the code to uncover latent defects and modified in accordance with the teachings of the present invention, accesses a fix 38 from its memory location 30.

The debugging tool 32 examines each line of the fix assembly code 38, and by means of a branch locator module 39 automatically identifies each location within the assembly code where a branch occurs. Using its tracepoint-placement capabilities (i.e., provided by the GDB) a tracepoint inserter module 40 of the tool 32 automatically inserts a tracepoint immediately after the beginning of each located branch (and also, optionally, at the target address pointed to by the branch command). This tracepoint, in addition to initiating any other conventional activity desired by the testing engineer (e.g., recording register contents, printing out indicia of current variable values, etc.) is configured to generate a positive indicator, e.g., a visible marker displayed on the output device 24 of FIG. 1, in response to the program control flow having reached the location within the assembly code where the tracepoint has been inserted. This tracepoint becomes an integral part of the assembly code.

It should be pointed out that automatically locating each branch is particularly straightforward when dealing with assembly code, whereas it would be extremely difficult (and virtually impossible, in the case of particularly complex programs) to do so with source code. This is because source code, which typically is written in high-level programming languages, generally uses a variety of different commands to create branches, and can create implicit, or nested, branches. However, in assembly language, all branches are made explicit, and the specific code that creates a branch can be readily recognized, thereby permitting each branch to be automatically located and identified.

When the fix assembly code 38 containing the tracepoints is executed by the processor 12, then all the testing procedures or test cases formulated by the software developer and implemented by the debugging tool 32 exercise the code. The inventors of the present invention have recognized that if the program flow of control passes through each branch of the assembly code 38, then the chances of finding errors in the code will be increased. At the same time, it is recognized that failure to pass through any particular branch does not mean that an error necessarily exists in such branch, only that the test procedures or test cases are inadequate to exercise that branch and need to be changed accordingly. Thus, upon completion of a first iteration of the testing procedure, the invention can generate screen displays 42 and 53, typical examples of which are shown in FIG. 3 and FIG. 4 respectively, for identifying the indicators generated by tracepoints that have been reached by the program control flow. Highlighted (e.g., differently colored) portions 44 of the display 42, capable of being displayed on a typical computer monitor (an example of an output device 24), indicate those locations where tracepoints had been placed, i.e., at addresses 0x48a680, 0x48a690 and 0x48a69c of the assembly code being tested. If the status of a particular tracepoint is desired, the display of FIG. 4 can be invoked, which indicates the number of "hits" that a particular tracepoint has experienced (i.e., the number of times that the program control flow has passed through, and therefore executed, that tracepoint). In this particular case, at 54 a legend "0x6" indicates that the tracepoint at address 0x547858 has been "hit" 6 times, whereas at 56, a legend "0x0" indicates that the tracepoint at address 0x547ac4 has been "hit" 0 times, i.e., it has been missed entirely by the program control flow.

Thus, those tracepoints within the assembly code that have not been passed through can be determined easily, as can the associated branches, i.e., those that have not been exercised by the test cases. The lines of assembly code within the omitted branches can easily be correlated, using the CVS tool (or similar tool) in conventional fashion, to the corresponding lines of source code from which such assembly code had been produced, and a software developer, upon analyzing these lines of source code, can decide upon the appropriate changes that should be made to the test cases (or new test cases that should be added) in order to force the program control to flow through the omitted branches and consequently through the associated tracepoints.

Clearly, this process of identifying missed branches, modifying the test cases, re-executing the program code with the remaining tracepoints, and checking for indicators generated by the tracepoints can be repeated as many times as necessary to insure that all the intended branches have been exercised.

In a preferred embodiment of the present invention, each tracepoint also is configured in such a way as to automatically remove its implementing code from the executable code as soon as it has performed its required function of generating its associated indicator. In this way, after sufficient iterations have occurred to insure that all the intended branches have been exercised, all the tracepoints will have been removed, and the successfully tested code will be in suitable condition for being executed for its intended purpose, or for being integrated into the preexisting program upon which it depends. Furthermore, eliminating the tracepoint immediately, as opposed to waiting until completion of the testing of the entire program, prevents the tracepoint from potentially slowing down the overall testing operation. For example, if the tracepoint were to be located in a branch that is repeatedly executed during a typical testing operation, then the tracepoint also would be repeatedly executed (unless removed), and therefore could tie up valuable testing resources.

At the same time, it should be noted that if a particular tracepoint has been configured to perform additional functions as discussed above (e.g., recording register contents, printing out indicia of current variable values), then repeated execution of that tracepoint may be desirable, since the collection of additional data may prove useful in the elimination of certain bugs. So, the testing engineer is free to make the necessary trade-offs.

As discussed above in connection with FIG. 2, placing a single tracepoint immediately after the beginning of each branch of assembly code will yield beneficial results. For example, after a single iteration of the testing procedure, if all tracepoints are indicated as having been successfully executed, then no further action is necessary. However, if the presence of a non-executed tracepoint indicates that its corresponding branch has not been successfully executed, then, especially in the case of complex branches, the use of only a single tracepoint per branch may not be sufficient to pinpoint the exact cause of the testing failure, e.g., unsuspected bugs. Therefore, the present invention can be operated in a mode in which a second tracepoint is automatically placed at the target address of each branch, in order to facilitate the identification of these causes.

Figure 6:
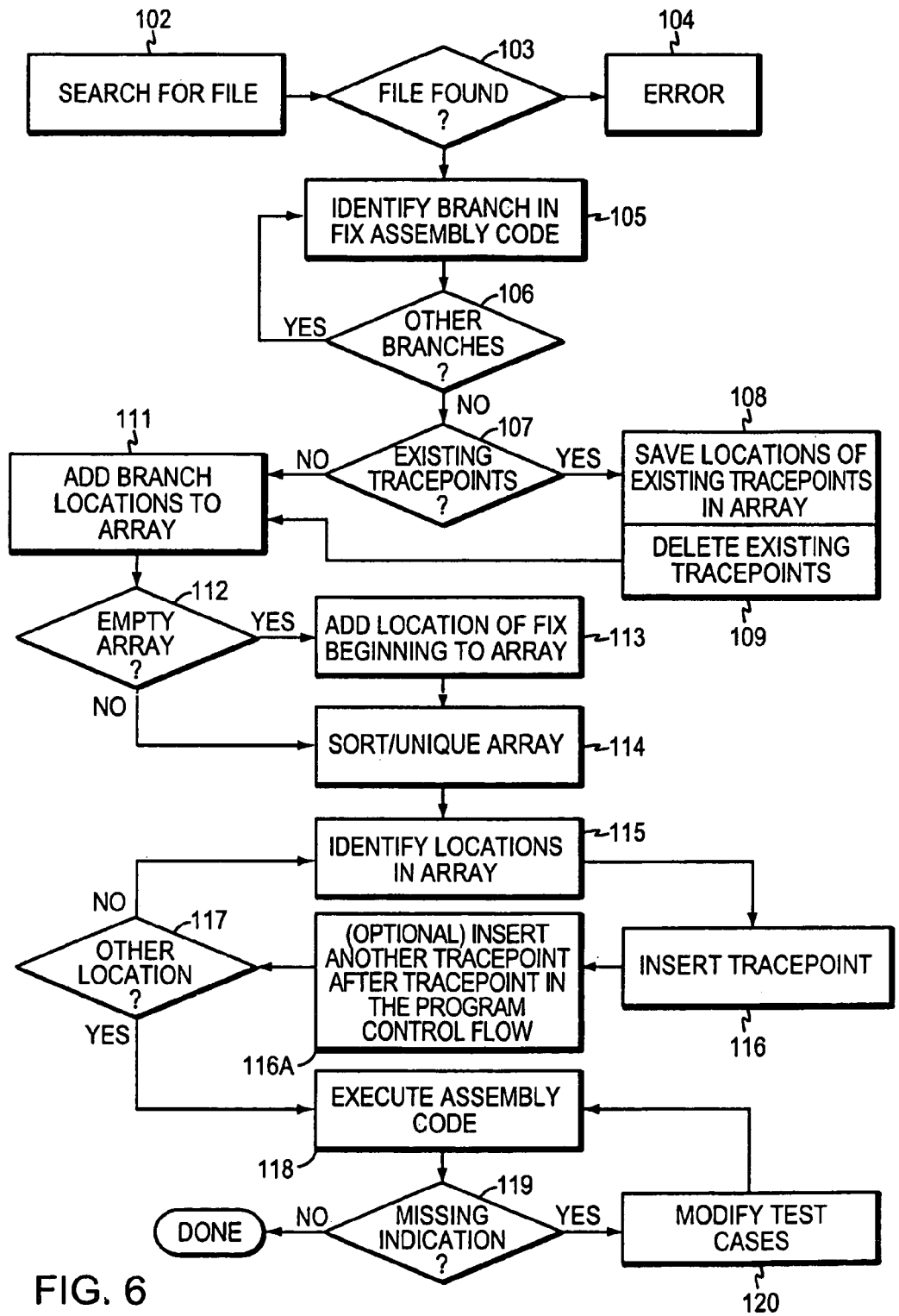
FIG. 6 is a flow diagram illustrating typical operation of the present invention.

FIG. 6 demonstrates the flow of the overall process 100 implemented by the present invention, including the above-mentioned iterative steps. At step 102, the memory location 30 is searched, to access any fix files containing code that is to be tested for bugs. At step 104, if no such code is located, an error statement is displayed. Otherwise, if a file is found, the process proceeds from step 103 to step 105, where the fix assembly code 38 is examined to identify the location of the first branch. In turn, the balance of the difference assembly code 38 is examined at step 106 to determine if there are additional branches. Once all branches have been identified, at step 107, the difference assembly code is checked for any tracepoints which already exist, for example, from previous test iterations. If there are none, the process jumps to step 111. If there are any existing tracepoints, their locations are saved in an array at step 108, and at step 109, these tracepoints are deleted from the code. Once all existing tracepoints have been found, the locations of the branches are added to the array. At step 112, the array is checked. If it is empty, the location of the first executable command in the fix is added to the array at step 113 to ensure that there will be at least one tracepoint for the fix. Then, or immediately after step 112 if the array is not empty, the array is sorted and uniqued to eliminate duplications at step 114. At step 115, the first location in the array is identified and at step 116, assembly code implementing a tracepoint is created and inserted at that location. In turn, the balance of the array is examined at step 117 and tracepoints are inserted as indicated. This procedure is used to set the tracepoints in order and prevent the setting of multiple tracepoints on the same address.

When tracepoints have been introduced into each branch of the assembly code 38, the assembly code is executed at step 118.

Step 119 determines which of the inserted tracepoints have generated their intended indicators (e.g., on display 42) and if any omitted indicators are identified, the test cases implemented by the debugging tool may be modified at step 120 by the program developer so as to exercise the omitted branches corresponding to the omitted indicators, and the assembly code is re-executed in accordance with the new test cases. If omitted indicators are not identified, the test process is done.

It should be pointed out that, to further improve the likelihood of uncovering defects, particularly defects that might be contained within conditional sub-branches nested within each branch, the invention may be configured to insert tracepoints not only immediately after the beginning of each branch but also immediately after the completion of each such branch.

While specific embodiments of the invention have been described herein, it will be appreciated by those skilled in the art that various modifications and variations, including additions and subtractions, may be made to the disclosed invention without departing from its spirit and scope, and it is intended that such modifications remain within the scope of the following claims.

What is claimed is:

1. A method of testing computer program code, comprising the steps of:
   (a) accessing the code in a format that is operable on a designated computer;
   (b) within a single step:
       (i) automatically examining the computer-operable form of the code to locate in the computer-operable form of the code all executed and unexecuted explicit branches that occur within the computer-operable code; and
       (ii) automatically inserting in the computer-operable form of the code, within each explicit branch, first and second tracepoints configured to generate indicators in response to the program control flow passing through such positions, the first tracepoint inserted being immediately after the beginning of the branch, the second tracepoint being inserted after the first tracepoint in the program control flow, the second tracepoint being inserted immediately after completion of the branch, the branch comprising a nested conditional sub-branch;
   (c) executing the computer-operable code containing the tracepoints on said computer;
   (d) identifying which of the intended indicators have been generated by their corresponding tracepoints; and
   (e) based on the identification, uncovering a defect contained in the nested conditional sub-branch.

2. The method according to claim 1, wherein another tracepoint is inserted at the target address of the branch.

3. The method according to claim 1, wherein it is determined that one or more indicators have not been generated, due to the program control flow having failed to pass though the positions associated with the corresponding tracepoints, and further comprising:
   revising the program control flow to cause it to pass through such positions.

4. The method according to claim 2, wherein it is determined that one or more indicators have not been generated, due to the program control flow having failed to pass though the positions associated with the corresponding tracepoints, and further comprising:
   revising the program control flow to cause it to pass through such positions.

5. The method according to claim 3 wherein the program control flow is governed by one or more test procedures operating on the computer-operable code, and wherein such program control flow is revised by modifying the one or more test procedures.

6. The method according to claim 4 wherein the program control flow is governed by one or more test procedures operating on the computer-operable code, and wherein such program control flow is revised by modifying the one or more test procedures.

7. The method according to claim 1, further comprising:
   automatically deleting each tracepoint after (i) the program flow has passed through its associated position within the computer-operable code and (ii) such tracepoint has generated its intended indicator, and
   restoring the computer-operable code to its condition prior to the insertion of such tracepoint.

8. The method according to claim 1, wherein the computer-operable code is assembly code.

9. The method according to claim 8, wherein the computer program code to be tested is stored in a memory location prior to its testing, and further comprising:
   accessing the computer program code from its memory location.

10. A method of testing computer program code, comprising the steps of:
    (a) accessing the code from a memory location in which it is stored in assembly code form;
    (b) within a single step:
        (i) automatically examining the assembly code to locate in the assembly code all executed and unexecuted explicit branches that occur within the assembly code; and
        (ii) automatically inserting into the assembly code, within each explicit branch, first and second tracepoints configured to generate an indicators in response to the program control flow passing through such positions, the first tracepoint inserted being immediately after the beginning of the branch, the second tracepoint being inserted after the first tracepoint in the program control flow, the second tracepoint being inserted immediately after completion of the branch, the branch comprising a nested conditional sub-branch;
    (c) executing the assembly code containing the tracepoints on said computer;
    (d) identifying which of the intended indicators have been generated by their corresponding tracepoints;
    (e) if one or more indicators have failed to be generated, due to the program control flow having failed to pass though the positions associated with the corresponding tracepoints, then revising the program control flow to cause it to pass through such positions;
    (f) iteratively repeating steps (c) through (e) until execution of step (d) identifies all of the intended indicators as having been generated; and
    (g) based on the identification, uncovering a defect contained in the nested conditional sub-branch.

11. A method according to claim 10, wherein another tracepoint is inserted at the target address of the branch.

12. A method according to claim 10, and further comprising:
    automatically deleting each tracepoint after (i) the program flow has passed through its associated position within the code and (ii) such tracepoint has generated its intended indicator.

13. A computer-readable medium having stored thereon instructions for testing computer program code which, when executed by a processor, cause the processor to perform the steps of:
- (a) accessing the code in a format that is operable on a designated computer;
- (b) within a single step:
  - (i) automatically examining the computer-operable form of the code to locate all executed and unexecuted explicit branches that occur within the computer-operable code; and
  - (ii) automatically inserting in the computer-operable form of the code, within each explicit branch, first and second tracepoints configured to generate indicators in response to the program control flow passing through such positions, the first tracepoint inserted being immediately after the beginning of the branch, the second tracepoint being inserted after the first tracepoint in the program control flow, the second tracepoint being inserted immediately after completion of the branch, the branch comprising a nested conditional sub-branch;
- (c) then executing the computer-operable code containing the tracepoints on said computer;
- (d) identifying which of the intended indicators have been generated by their corresponding tracepoints; and
- (e) based on the identification, uncovering a defect contained in the nested conditional sub-branch.

14. The computer-readable medium according to claim 13 wherein another tracepoint is inserted at the target address of the branch.

15. A computer-readable medium having stored thereon instructions for testing computer program code that is a revised version of preexisting computer program code which, when executed by a processor, cause the processor to perform the steps of:
- (a) accessing the revised computer program code in assembly code form;
- (b) within a single step:
  - (i) automatically examining the assembly code to locate in the assembly code all executed and unexecuted explicit branches that occur within the assembly code; and
  - (ii) automatically inserting in the assembly code, within each explicit branch, first and second tracepoints configured to generate indicators in response to the program control flow passing through such positions, the first tracepoint inserted being immediately after the beginning of the branch, the second tracepoint being inserted after the first tracepoint in the program control flow, the second tracepoint being inserted immediately after completion of the branch, the branch comprising a nested conditional sub-branch;
- (c) then executing the assembly code containing the tracepoints on said computer;
- (d) identifying the tracepoints that have not generated their corresponding indicators;
- (e) identifying each branch of assembly code in which there is a tracepoint that has not generated its indicator;
- (f) correlating each identified branch of assembly code with the source code corresponding to such branch of assembly code; and
- (g) based on the identification, uncovering a defect contained in the nested conditional sub-branch.

16. The computer-readable medium according to claim 15 wherein another tracepoint is inserted at the target address of the branch.

17. The computer-readable medium according to claim 15, having stored thereon further instructions which, when executed by the processor, cause the processor to perform the step of:
- automatically deleting each tracepoint after (i) the program flow has passed through its associated position within the code and (ii) such tracepoint has generated its intended indicator.

* * * * *